Feb. 3, 1953 F. SPRAGUE ET AL 2,627,251
WINDSHIELD WIPER MOTOR
Filed Oct. 17, 1949 2 SHEETS—SHEET 1
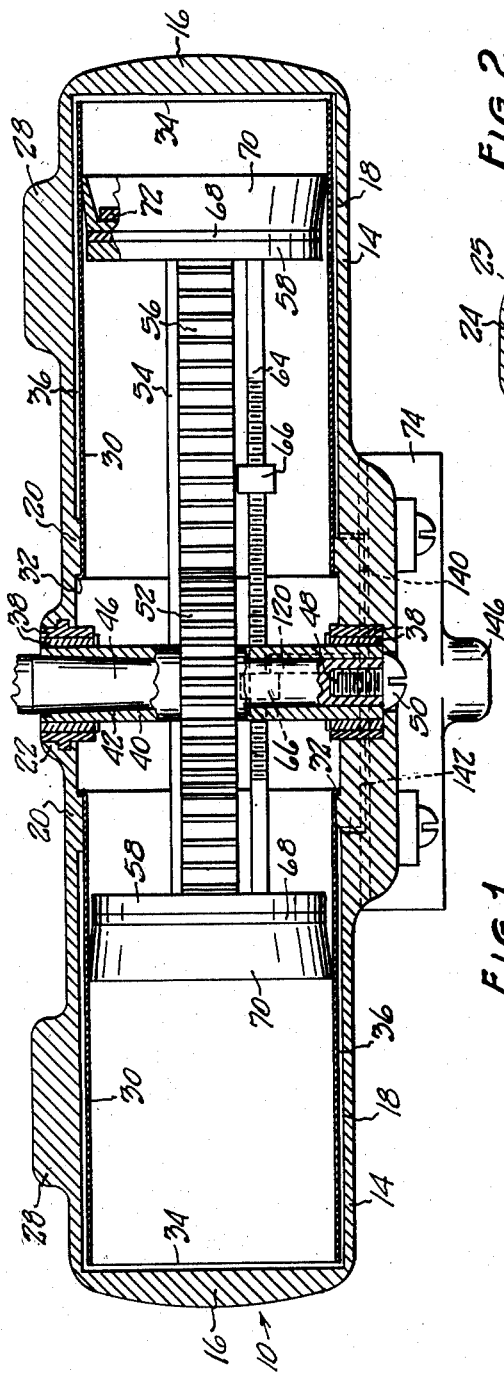
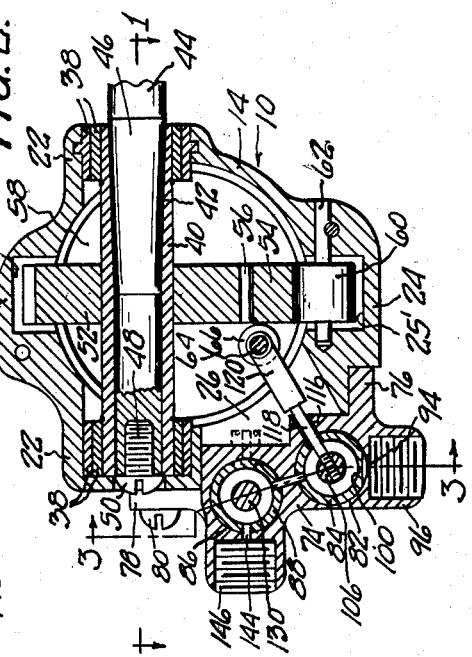
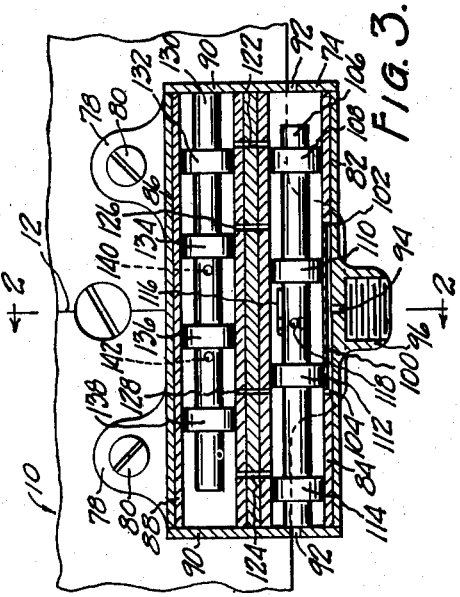
INVENTORS.
ELTON F. NICHOLS.
FRANK SPRAGUE
BY Oltsch & Knoblock
ATTORNEYS.

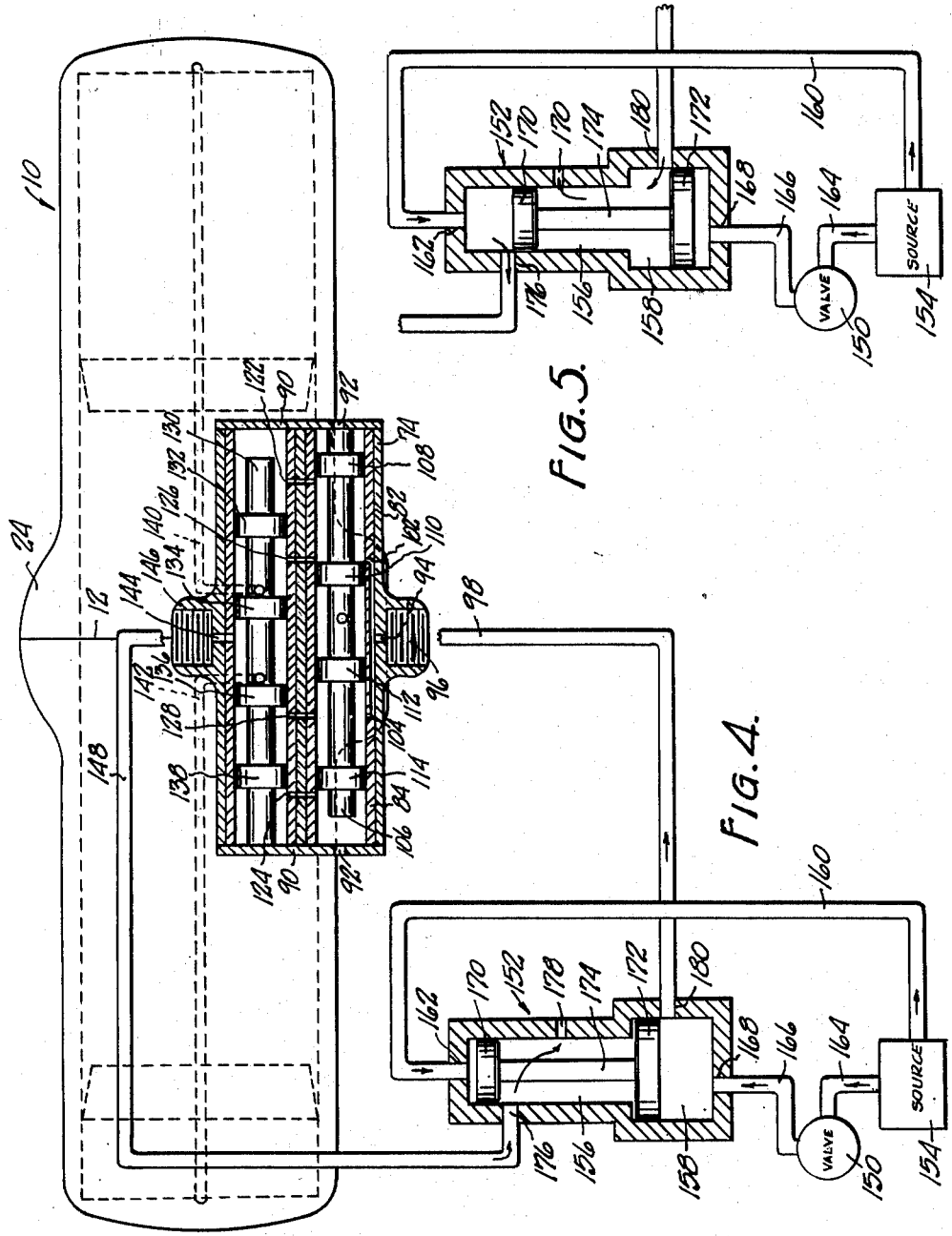

Patented Feb. 3, 1953

2,627,251

UNITED STATES PATENT OFFICE 2,627,251

WINDSHIELD WIPER MOTOR

Frank Sprague and Elton F. Nichols, Michigan City, Ind., assignors to Sprague Devices, Inc., Michigan City, Ind., a corporation of Indiana Application October 17, 1949, Serial No. 121,842

10 Claims. (Cl. 121—157)

This invention relates to improvements in windshield wipers, and more particularly to windshield wipers of the type adapted to be operated by a difference in pressure acting upon opposite sides of a shiftable member.

The primary object of this invention is to provide a device of this character which does not require the use of springs and in which all of the moving parts, including the reversing mechanism, are actuated by a difference in pressure of an actuating fluid, such as air.

A further object is to provide a device of this character in which the number of moving parts or units is reduced to a minimum to facilitate simplicity of construction and assembly of the device.

A further object is to provide a device of this character which is simple in construction, in which the constituent parts are formed of castings and like units which can be fabricated quickly and inexpensively and in which the requirement for machined parts is reduced to a minimum and whose construction is inexpensive.

A further object is to provide a device of this character having a novel means for positioning the wiper and the motor parts when the device is not operating.

A further object is to provide a windshield wiper with wiper blade positioning means actuated by fluid pressure and requiring a minimum number of moving parts.

Other objects will be apparent from the following specification.

In the drawings:

Fig. 1 is a longitudinal horizontal sectional view taken on line 1—1 of Fig. 2.

Fig. 2 is a transverse sectional view taken on line 2—2 of Fig. 3.

Fig. 3 is a fragmentary detail sectional view taken on line 3—3 of Fig. 2.

Fig. 4 is a part schematic view illustrating the "parking" or blade positioning means in one operative position.

Fig. 5 is a fragmentary view of the "parking" device is another operative position.

Referring to the drawings which illustrate the preferred embodiment of the invention, the numeral 10 designates the housing of the windshield wiper which is preferably formed of two cup-shaped sections which are axially aligned and which are secured together with the edges at the open ends thereof abutting to form a joint 12. The cup-shaped sections are preferably cast or molded and are formed of right and left parts, as best seen in Fig. 1, and each thereof includes a cylindrical portion 14 and an outer end wall 16 formed integrally and so shaped that the inner surfaces thereof at 18 are cylindrical adjacent the end wall 16. The cylindrical surface 18 is preferably interrupted at its outer end portion by lugs 19 and by a reduced diameter cylindrical portion 20 adjacent the open end thereof. The meeting end portions of the cup-shaped housing members are transversely configured to substantially the form illustrated in Fig. 2 providing the transversely aligned bearing receiving portions 22, the substantially vertically aligned grooved gear-receiving portions 24, and the front opening 26 at the central portion of the housing. It will be understood that mounting lugs 28 may be formed on the device if desired.

Each of the cup-shaped housing parts form one end of a substantially closed cylinder within which a piston may reciprocate with a substantially sealed or airtight fit. Each of the sections is lined by a preformed tubular member 30 which has a smooth inner surface facilitating the reciprocation of a piston therein responsive to differences in fluid pressure at opposite sides of the piston. As best seen in Fig. 1, the preformed cylinders 30 are of a size and shape to be positioned by lugs 19 at their outer ends and to fit snugly within the reduced diameter cylindrical or shouldered portions 20 of the cup-shaped housing portions. The preformed cylinders 30 preferably have a substantially airtight fit within said reduced portions 20, for example, a press fit. At the end of each preformed liner member 30 adjacent the center of the windshield housing is formed an out-turned flange 32 which bears against the shoulder of the housing portion 20 facing the center of the housing. The length of the preformed tube or liner 30 is such that its opposite edge 34 terminates spaced from the adjacent end wall 16 of the housing. Consequently, the space within the liner 30 communicates with the substantially cylindrical clearance space 36 between the liner 30 and the cylindrical housing wall 14 and extending between the shoulder portion 20 and the outer end wall 16.

The portions 22 of the casing receive axially aligned bearings 38 within which is journaled transverse sleeve 40 which may be locked in place by split rings or any other means found suitable. The bore of the sleeve 40 at one end thereof is preferably tapered at 42 so that the mouth of the sleeve at that end is of larger diameter than at its opposite end. The sleeve 40 mounts a shaft 44 which is adapted to carry the windshield wiper blade (not shown). The shaft 44 has a snug fit therein and is configured to have a wedged fit in said sleeve, as by the provision of a tapered portion 46 fitting within the tapered portion 42 of the sleeve. The shank 44 is held in place within the sleeve by a screw whose shank 48 is threaded in an axial bore in the small diameter bore of the shaft 44 and whose head 50 is of a size to bear against the end of the tube having the small diameter bore. Thus it will be apparent that as the screw 48, 50 is threaded into the axial bore in the end of the shaft 44, the margin of the head 50 will be brought into engagement with the left-hand end of the sleeve 40, as seen in Fig. 2, and thereupon continued rotation of the screw will draw the shaft 44 to the left and will bring the tapered parts 42, 46 into wedging engagement. The parts are thus held for rotation without slippage and are positioned in axial alignment by a single securing means, namely screw 48, 50 which can be easily applied and released to facilitate assembly and disassembly of the structure. The sleeve 40 fixedly mounts a gear 52 at its center which projects into the longitudinal groove 25 formed at the top of the casing in the top portion 24. It will be observed that the sleeve 40 and the shaft 44 are located above the axis of the cylinder of the housing.

A piston unit, which is preferably cast integrally, is received within the housing and includes an elongated rigid connector portion 54 having integrally formed therewith a toothed rack 56. The connector portion 54 mounts end plates 58 at its opposite ends, which end plates are preferably circular, are positioned transverse of the housing substantially concentric therewith and have clearance with the inner surface of the cylinder liners 30. The parts 54, 56 and 58 are preferably formed integrally, and the parts 54 and 56 are located eccentrically, as best seen in Fig. 2, so that the rack 56 may mesh with the gear 52. A roller 60 is journaled upon a pin or shaft 62 locked in a bore in the housing. The pin 62 intersects the groove 25' formed in the bottom frame portion 24, and the roller 60 fits within said groove 25' with clearance and in such a position that the bottom surface of the rigid connector portion 54 bears upon said roller. The roller 60 is preferably positioned directly below the sleeve 40 so that it will support the rack and connector 54, 56 at the point at which the gear 52 meshes with said rack. Alongside the support 54 and extending parallel thereto is a screw-threaded shaft 64 whose opposite ends are carried by the circular plates 58. Adjustably mounted upon the threaded shaft or rod 64 are a pair of internally screw-threaded stop members 66 which preferably are located equi-spaced from the adjacent end plates 58 but which may be positioned at any selected point along the shaft 64 and in unbalanced relation, that is, the spacing of one of the members 66 from the adjacent plate 58 may be more or less than the spacing of the other stop 66 from the end plate 58 adjacent thereto. Fluid-tight pistons are mounted upon the members 58, the same preferably including an inner plate portion 68, which bears flat against the outer face of the part 58, a cup-shaped resilient member 70 which may be formed of leather, rubber, plastic material or the like, and an inner plate 72 bearing against and fitting within the cup-shaped piston member 70. The open ends of the cup-shaped members 70 face outwardly, as seen in Fig. 1. While this construction of piston is preferred, it will be understood that the pistons may be formed of any other construction found suitable and practical.

A valve body or block 74 is secured to the main body or cylindrical housing 10 to span and close the opening 26 of the latter. The valve body 74 is so shaped and contoured that it fits against the body or cylindrical housing 10, for which purpose it may be provided with flanges, ears or securing members to facilitate connection of the parts. Thus at the bottom along its length, the valve body 74 may have a flange 76 which bears flat against a portion of the bottom surface of the body 10, and at its top the body 74 may be provided with ears 78 adapted to bear against the housing 10 and to be secured thereto as by screws 80. The body preferably has a lower cylindrical bore 82 lined by a preformed metal sleeve or tube 84 and an upper cylindrical bore 86 lined by a preformed metal tube or cylinder 88. End walls 90 close the ends of the cylinders defined by the tubes 84 and 88, and a vent 92 open to atmosphere is provided at each end of the cylinder defined by the tube 84, said vents 92 preferably being formed in the end walls 90, as shown in Fig. 3. Suitable gaskets (not shown) are provided where required.

An intake port 94 is open in communication with the bore 82 at substantially the center thereof, and a socket 96 is preferably formed integrally with the valve body 74 in register with the inlet 94 and is adapted to receive and have connected thereto a fluid conduit line 98, as best illustrated in Fig. 4. The sleeve 84 is flattened at 100, and said flattened portion 100 is positioned in register with the port 94 to provide a passage between the sleeve and the body extending the length of the flattened portion 100. Apertures or ports 102 and 104 are formed in the sleeve at the opposite ends of the flattened portion 100. Consequently, fluid from the line 98 may enter into the sleeve or cylinder 84 through the port 94, the passage provided by the sleeve portion 100 and the ports 102 and 104 which are preferably equi-spaced from and at opposite sides of the port 94. A valve rod 106 mounts a plurality of cylindrical members or piston-like parts 108, 110, 112 and 114 in spaced relation along its length. The members 108, 110, 112 and 114 are preferably similarly constructed, and each has a sealing fit within the tube or cylinder 84 which prevents the leakage of fluid therepast. The members 108 and 114, positioned at opposite ends of the rod 106, are spaced inwardly from said ends a slight distance. The members 110 and 112 are equi-spaced from the center of the rod 106 and are spaced apart a distance such that the outermost surfaces thereof are spaced a distance less than the spacing between the ports 102 and 104. The shaft 106 is shorter than the sleeve 84, and the difference of the lengths of these parts subtracted from the spacing between the ports 102, 104 represents substantially the spacing or a spacing slightly greater than the distance between the outermost faces of the members 110 and 112.

The valve body 74 and the sleeve 84 are provided with registering elongated slots 116 extending inwardly and opening at the cavity of the body 10, as best seen in Fig. 2. The slot 116 is of comparatively short length and slidably receives a pin 118 having one end thereof threaded in the rod 106 substantially at the center thereof to be fixedly secured to said rod. The pin 118 mounts a head portion 120 which either bears against or slidably encircles the rod 64 between the heads 66. It will be apparent that as the piston unit 54, 64, 58, 70 reciprocates, one or the other of the two stops 66 thereof will come into engagement with the pin unit 118, 120 as said unit nears the end of a stroke and carries that pin structure and the valve unit, including the rod 106 and the cylindrical portions 108, 110, 112, 114 therewith, through the elongated slots 116.

A plurality of ports provide communication between the interiors of the valve cylinders 84 and 88. Thus two ports 122, 124 establish communication between the opposite ends of the cylinders, said ports being spaced from the ends of the cylinders a distance slightly greater than the spacing between the inner faces of the members 108 and 114 from the adjacent end surfaces of the rod 106, as best illustrated at the left in Fig. 3. A second pair of ports 126 and 128 are located in substantially equi-spaced relation to the opposite ends of such cylinders and preferably are spaced apart a distance substantially equal to the spacing between the ports 102 and 104.

A rod or shaft 130 of substantially the same length as the rod or shaft 106 is received within the cylinder 88 and mounts a plurality of sealing members or piston-like parts 132, 134, 136 and 138 which preferably correspond to the members 108—114 on the rod 106 in that each has a sliding, sealing fit within its tube or sleeve 88 to prevent the leakage of fluid therepast. The outermost members 132 and 138 are mounted upon the shaft 130 with their outer faces spaced from the end of the shaft 130 a distance greater than the spacing of the ports 122 and 124 from the ends of the cylinders 84, 88, as best illustrated at the right in Fig. 3. The members 134 and 136 are mounted on the shaft 130 in equi-spaced relation to the center thereof and preferably are spaced apart substantially the same dimension as the spacing of the members 110 and 112.

A port 140 is formed in the valve body 74 and the sleeve 88 for communication between the cavity of the housing 10 at a point outwardly of the reduced portion 20 at the right-hand end of the cylinder unit as viewed in Fig. 1, and a second port 142 similarly constructed is provided in spaced relation thereto and communicates with the interior of the body 10 outwardly of the reduced cylindrical portion 20 at the left-hand side of said figure. The ends of these ports 140, 142, communicating with the cylinder 88, are preferably spaced substantially equally from the longitudinal center of the tube 88 at such a distance that one of the members 134 and 136 is always positioned between the ports or both members 134 and 136 simultaneously span and close said ports. An exhaust port 144 is formed in the tube 88 and the body 74, and a socket 146 registers therewith for connection of a line 148, as best seen in Fig. 4. It will be understood, however, that the line 148 need not be used in all instances and that the port 144 may provide a direct communication with atmosphere.

When the device has been assembled with the parts arranged as described and illustrated herein, fluid under pressure, such as air, is supplied thereto from the line 98 under the control of a manually operable valve, such as the valve 150. Assuming that the primary valve, including the parts 106—114, is in the position illustrated in Fig. 3, air from the line 98 will enter the port 94, the passage 100 and the ports 102 and 104 into the spaces between the valve elements 108, 110 and between the valve elements 112 and 114. Air entering the port 102 is discharged from the cylinder 84 through the port 126 and enters the cylinder 88 between the pistons or valve members 132, 134 against which it acts equally and is rendered static. Air which enters the cylinder 84 at the port 104 is discharged therefrom through the ports 124 and 128. Air which enters the cylinder 88 through the port 124 acts upon the valve member or piston 138 and exerts a pressure causing movement of the same, its mounting shaft 130, and the other piston or sealing members 132, 134 and 136 mounted on said shaft, to the position illustrated in Fig. 3, the right-hand end of the shaft 130 bearing against the right-hand end wall 90 of the valve unit. In this position of the parts, air which enters the cylinder 88 from the port 128 passes to the bore 142. The bore 142 communicates with the space between the cylinder sleeve 18 and the cylindrical wall 14 of the body at the left-hand end thereof, as viewed in Fig. 1, thereby causing a pressure to be applied to the outer surface of the left-hand piston in Fig. 1 to cause movement of the piston unit and associated parts to the right, as viewed in Fig. 1. During this stroke the air at the outer end of the right-hand cylinder, which is pushed by the right-hand piston 70, is discharged from that cylinder through the port 140 and thence through the port 144, which, being positioned substantially centrally of the length of the cylinder 88, is in free communication with the port 140.

It will be apparent that as the piston unit approaches the end of its stroke toward the right, as viewed in Fig. 1, the left-hand nut 66 comes into engagement with the pin 120 carried by the stem 106 of the primary valve and moves that pin and the valve stem to the right, as accommodated by the slot 116, to the position illustrated in Fig. 4. Thereupon the air which enters the port 102 is divided and permitted to enter the ports 122 and 126. The air entering the port 122 acts upon the outer end of the piston or sealing member 132 and moves the shaft or rod 130 and its sealing members 132, 134, 136 and 138 to the left, that is, to the position illustrated in Fig. 4.

The pressure responsive movement of the secondary valve units 130—138 to the left causes pressure in the cylinder 88 on the left of the sealing member 138 to be exhausted through the port 124, the left-hand end of the cylinder 84, and the left-hand vent port 92. Thus the movement of the shiftable parts 106—114 of the primary valve member serves to control the flow of fluid for the purpose of positioning the shiftable parts 130—138 of the secondary valve to exhaust the pressure condition previously existing at one end of said secondary valve and to supply fluid under pressure at the opposite end of the device to thereby change the setting of the secondary valve.

In the position of the valves illustrated in Fig. 4, fluid entering the cylinder 84 at the port 102 is discharged through the port 126 into the cylinder 88 between the seals 132 and 134 which have now been so positioned as to open the port 140 into communication with the port 126. Fluid under pressure thus is supplied to the right-hand cylinder to cause the piston unit to be shifted to the left as viewed in Fig. 1. The fluid at the left-hand end of the cylinder displaced by the left-hand piston is exhausted through the port 142 which has been placed in communication with the port 144 as seen in Fig. 4. The stroke or movement of the piston to the left continues until the right-hand abutment 66 has engaged the pin 120 and moved the same and the shiftable elements 106—114 of the primary valve from the Fig. 4 position to the Fig. 3 position, thus setting up a reverse flow path for fluid, and particularly a flow path between the ports 104 and 124 at the left-hand end of the unit, and a flow path between the port 122 and the right-hand vent port 92, which causes the fluid pressure to return the shiftable elements 130—138 of the secondary valve to the Fig. 3 position.

It will be observed that the number of moving parts of this device is small, the same being arranged in units and constituting the shiftable parts of the primary valve as one unit, the shiftable parts of the secondary valve as a second unit, the piston, the connecting rack and the rod 64 as a third unit, and the shaft 44, sleeve 40 and gear 52 as the fourth unit. None of the moving parts are subject to or under the influence of springs, and all of the parts are positively operated either mechanically or, in the case of the elements of the secondary valve, by fluid pressure. This feature of the construction results in simplicity of manufacture and assembly, reduction in cost, and efficient and trouble-free operation.

Another advantage of this construction is the fact that the stroke of the pistons may be controlled easily and through a wide change of adjustment. This adjustment is effected by simply changing the position of one or both of the abutment members 66 so as to control the time at which the abutments engage and shift the finger 120 and the shiftable valve elements of the primary valve during the course of the stroke of the device. It will be observed that as the space between the abutments 66 is reduced, the amplitude of the stroke of the pistons will be reduced. Similarly, as the spacing between the abutments is increased, the amplitude of the stroke will be increased, subject to the limitation that the parts may not be spaced so far apart that an abutment will fail to engage and shift the pin before the piston reaches the full end of its operative stroke or movement within the cylinder housing.

Another adjustment which is possible is to position the abutments so that the spacing between one thereof and the piston adjacent thereto is different from the spacing between the other and the piston adjacent to the other. This will serve to change the location of the segment or arc through which the shaft 44 rotates. In this connection it will be observed that the gear 52 is large and has a number of teeth so related to the number of teeth upon the rack 56 that the shafts 44 will normally operate through a segment or stroke of less than 180 degrees. The various adjustments mentioned facilitate the application of the windshield wiper to vehicles of different structural characteristics.

A desirable feature of any windshield wiper is the provision therein of means for "parking" or positioning the windshield wiper blade at an end of its stroke so that it is out of the line of vision of the operator when not in use. Means for accomplishing this result are illustrated in Figs. 4 and 5. This means constitutes the differential valve unit 152 which is interposed in the system between the control valve 150 and the pressure source 154 on the one hand, and the conduits 98 and 148 on the other hand. This differential pressure valve comprises a housing having at one end a small diameter cylindrical bore 156, and at its opposite end a bore 158 of larger diameter. A line 160 connects the fluid pressure source 154 with the end of the cylinder bore 156, said connection being effected at an opening 162 in the end wall of the valve 152 at the outer end of the small diameter chamber thereof. A line 164 connects the source of pressure with the valve 150. A line 166 connects the valve 150 with the large diameter cylinder bore 158 at a port 168 in the end wall of the valve 152.

A valve unit is shiftable within the valve housing 152 and includes a sealing member or piston 170 shiftable in and having a sealing slide fit within the small bore portion 156 of the cylinder. A second piston or sealing member 172 is shiftable in and has a sealing fit within the large diameter cylindrical portion 158. A rigid rod 174 fixedly connects the pistons 170 and 172 in predetermined spaced relation. The parts are so arranged that when the valve 150 is open to permit fluid under pressure from the source 154 to pass into the large diameter cylinder bore 158 simultaneously with the supply of fluid under pressure through line 160 from the source to the small diameter bore of the cylinder, the difference in area of the two pistons 172 and 170 will cause the piston unit to assume the position shown in Fig. 4, being at the end of its stroke toward the small diameter end of the valve housing 152. The line 148 is connected to the small diameter cylinder bore 156 intermediate its ends and at a port 176 so spaced and positioned from the end of the housing in which the port 162 is formed that it exceeds the axial dimension of the piston member 170 and is open into full communication with the cylinder bore when the valve parts 170 and 172 are in their normal pressure difference responsive position. A vent 178 is formed in the differential valve housing spaced longitudinally thereof from the port 176 a distance greater than the axial dimension of the sealing member 170 and in such position that the sealing member 170 may be positioned between the ports 176 and 178 when in the Fig. 5 position, for purposes to be described. The line 98 is connected to the valve at a port 180 intermediate the length of the large diameter cylinder bore 158 and substantially centrally thereof so as to be fully opened when the sealing member 172 is in both its Fig. 4 and its Fig. 5 position.

Fig. 4 illustrates the normal operating position of the device in which the valve 150 is open so that the differential valve assumes the position shown in Fig. 4 due to the difference in area of the two pistons 170 and 172 against which pressure from the source 154 acts. The pressure in the line 160 acting against the piston 170 is static but the pressure passing from source 154 through line 164, valve 150 and line 166 enters the large cylinder bore 158 and is discharged therefrom through the port 180 and the line 98 to the primary valve of the wiper motor. The fluid under pressure which is exhausted through the port 144 of the secondary valve of the windshield wiper passes through line 148, port 176, the small cylinder bore 156 and the port 178 to atmosphere.

As soon as the valve 150 is closed, however, thus stopping the supply of fluid under pressure to the large diameter cylinder bore 158, the fluid under pressure passing through line 160 and acting against the small diameter piston 170 is effective to shift the valve parts, 170, 172, 174 toward the large diameter end of the valve chamber to the position illustrated in Fig. 5. During this movement the piston or seal 170 will pass across the port 176 to assume a position between the ports 176 and 178, and the piston 172 will pass across the port 180 to assume a position between that port and the port 168. Thereupon the flow of fluid under pressure from the source through the two lines 98 and 148 is reversed, the line 148 becomes the inlet line to the wiper motor, and the line 98 becomes the outlet from the wiper motor. Fluid under pressure flows from source 154, line 160, through port 162 into the small cylinder chamber 156, thence through ports 176 and conduit 148 to port 144 of the secondary valve. When this occurs, assuming that the valve parts are in the position illustrated in Fig. 4, fluid under pressure will enter the valve port 142 and flow to the left-hand end of the cylinder as viewed in Fig. 1, thus causing movement of the piston toward the right. The fluid which is displaced ahead of the right-hand piston incident to that movement to the right is exhausted through port 140 between the seals 132 and 134 and thence passes through the port 126 into the primary cylinder between the seals 108 and 110, and thence passes out through port 102 to port 94 and the conduit 98. Fluid pressure from conduit 98 enters the large chamber bore of the cylinder 158 above the piston 172, that is, in the space between the pistons 170, 172, and is exhausted through the vent 178 with which it is in open communication as seen in Fig. 5.

Inasmuch as the setting of the primary and secondary valves of the wiper motor, shown in Fig. 5, which existed at the time the valve 150 was closed, was such that for normal operation with the valve 150 open the piston would be caused to move toward the left, it will be apparent that the closing of the valve 150 causes a reverse flow of fluid under pressure and reverses the direction of movement of the pistons so that the pistons can move toward the right until the left-hand abutment 66 engages the pin 120. Since the stem 106 of the primary valve is in engagement with the end wall at the right-hand end of the unit, no movement of the valve is effected, and the engagement of the left abutment 66 with the pin 120 serves to stop the movement of the pistons. Therefore, as long as any power is applied to the system thereafter while the valve 150 remains closed, that power or fluid pressure will be exerted in a direction to hold the device positively at one end of its stroke. Inasmuch as power is derived usually from a pump operated by the engine or motor of the vehicle whenever that engine or motor is actuated, there will be the application of power from fluid under pressure to the windshield wiper to either operate the windshield wiper or to position the windshield wiper at an end of its stroke at all times that the vehicle is in operation or in use.

One interesting attribute of the device is that the position in which the windshield wiper is "parked" will depend upon the position in which it was traveling, and more particularly, upon the position occupied by the primary and secondary valves, at the time the valve 150 is closed. Thus, if the valve 150 is closed while the primary and secondary valves of the windshield wiper occupy positions as illustrated in Fig. 3, then the piston unit which was set by said valves to travel toward the right will have its movement reversed and will travel toward and be "parked" at the left-hand end of its stroke.

Another interesting attribute is the fact that, regardless of the position at which the windshield wiper is "parked," the opening of the valve 150 will cause the operation of the windshield wiper to be resumed without difficulty or without manipulation other than the manual operation of the valve 150.

While the preferred embodiments of the invention have been illustrated and described herein, it will be understood that changes may be made in the construction within the scope of the appended claims without departing from the spirit of the invention.

We claim:

1. A windshield wiper comprising a housing having a pair of fluid passages opening therein at opposed points and an opening at substantially midlength thereof, a pressure responsive drive unit oscillatable in said housing and including a pair of spaced pistons positioned at opposite ends of said housing and outwardly of said housing opening, means fixedly connecting said pistons, a valve casing secured to said first housing to span said opening and having a primary valve chamber parallel to said housing and a secondary valve chamber communicating with said housing passages, said valve casing having a slot establishing communication between said primary valve chamber and said housing opening, a primary valve element shiftable in said primary valve chamber and including a projection extending through said slot and adjacent to said piston connecting means, spaced abutments carried by said piston connecting means and adapted to engage said projection, a secondary pressure-responsive valve element in said secondary valve chamber, said casing having an inlet, an outlet and a plurality of spaced passages connecting said valve chambers, said valves cooperating to control the flow of fluid under pressure between said inlet and said outlet in different paths through said passages and chambers to oscillate said drive unit.

2. A windshield wiper as defined in claim 1, wherein said housing comprises a pair of axially aligned cup-shaped members connected in communication.

3. A windshield wiper as defined in claim 1, wherein said housing comprises a pair of axially aligned cup-shaped members connected in communication and has a cylindrical bore of enlarged diameter adjacent its opposite ends, and a pair of preformed tubes fit in the opposite enlarged ends of said bore anchored at their inner ends in the portion of the bore between said enlarged end portions and spaced from said housing at the enlarged diameter portions and at the outer ends thereof, said first named passages opening into said bore at the space between the same and one of said tubes.

4. A windshield wiper as defined in claim 1, wherein each of said valves has a cylindrical bore and the control element thereof is of the spool type shiftable axially in said bore and including a plurality of spaced sealing members spanning said bore, said passages communicating with said cylindrical bores at spaced points.

5. A windshield wiper as defined in claim 1, wherein said housing is cylindrical and said valves are of the spool type and each has a cylindrical bore parallel to said housing and an axially shiftable spool having a plurality of spaced enlarged piston-like sealing portions.

6. A windshield wiper comprising a housing having a pair of fluid passages opening therein at opposed points, a pressure responsive drive unit oscillatable in said housing, a primary valve and a secondary valve cooperating to control flow of fluid in said passages between an inlet and an outlet, said valves being connected by a plurality of spaced passages controlled by said primary valve, and means actuated by said drive unit at the end of each stroke for reversing said primary valve, said secondary valve including an element shiftable in response to the flow pattern through said last named passages to control the flow in said first named passages, and a control system including a manual control valve, a source of fluid pressure and a differential pressure valve interposed in said system to control the flow of fluid in said system in response to the setting of said manual valve.

7. A windshield wiper comprising a housing having a pair of fluid passages opening therein at opposed points, a pressure responsive drive unit oscillatable in said housing, a primary valve and a secondary valve cooperating to control flow of fluid in said passages between an inlet and an outlet, said valves being connected by a plurality of spaced passages controlled by said primary valve, and means actuated by said drive unit at the end of each stroke for reversing said primary valve, said secondary valve including an element shiftable in response to the flow pattern through said last named passages to control the flow in said first named passages, and a fluid pressure network including a source of fluid pressure, a manual control valve and a valve having a pair of opposed actuating pistons of different areas, said manual valve being interposed in said system between said pressure source and the connection of the large area end of said last named valve in said system, whereby said last named valve controls flow in said system to and from said primary and secondary valves in one direction when said manual valve is open and in a different direction when said manual valve is closed.

8. The combination with a pressure responsive windshield wiper motor having a plurality of fluid passages terminating in a pair of ports and controlled by valves responsive to the operation of said motor, of a fluid pressure network connected at said ports and including a positioning valve, said positioning valve controlling the direction of flow of fluid through said motor and including a housing provided with a pair of chambers of different cross-sectional sizes and a shiftable valve element including spaced connected piston members slidable in different valve chambers, a manual valve, a source of fluid under pressure, and lines connecting said pressure source with opposite chambers of said positioning valve, said manual valve being interposed in the line leading to the large area chamber of said positioning valve.

9. The combination with a pressure responsive windshield wiper motor having a plurality of fluid passages terminating in a pair of ports and controlled by valves responsive to the operation of said motor, of a pair of conduits connected to said ports, a positioning valve including a chambered housing having a first set of spaced ports connected to said conduits and a shiftable valve element, said positioning valve having a vent between said first ports adapted to communicate with a selected one of said first ports according to the setting of said valve element, said valve element having a second set of spaced ports and being responsive to fluid pressure, and fluid pressure control means connected to said positioning valve at said second set of ports.

10. The combination with a pressure responsive windshield wiper motor having a plurality of fluid passages terminating in a pair of ports and controlled by valves responsive to the operation of said motor, of a fluid pressure network connected at said ports and including a pressure controlled reversing valve for controlling the path of flow of fluid to and from said ports and motor, and a manual control valve in said network actuable to control the setting of said reversing valve.

FRANK SPRAGUE.
ELTON F. NICHOLS.

REFERENCES CITED

The following references are of record in the file of this patent:

UNITED STATES PATENTS

| Number | Name | Date |
|---|---|---|
| 663,135 | Spencer | Dec. 4, 1900 |
| 896,571 | Ocain | Aug. 18, 1908 |
| 968,861 | Lindstrom | Aug. 30, 1910 |
| 1,363,333 | Lower | Dec. 28, 1920 |
| 1,674,056 | Oishei et al. | June 19, 1928 |
| 1,694,279 | Oishei | Dec. 4, 1928 |
| 2,263,003 | Koppelman | Nov. 18, 1941 |